Figure 1:
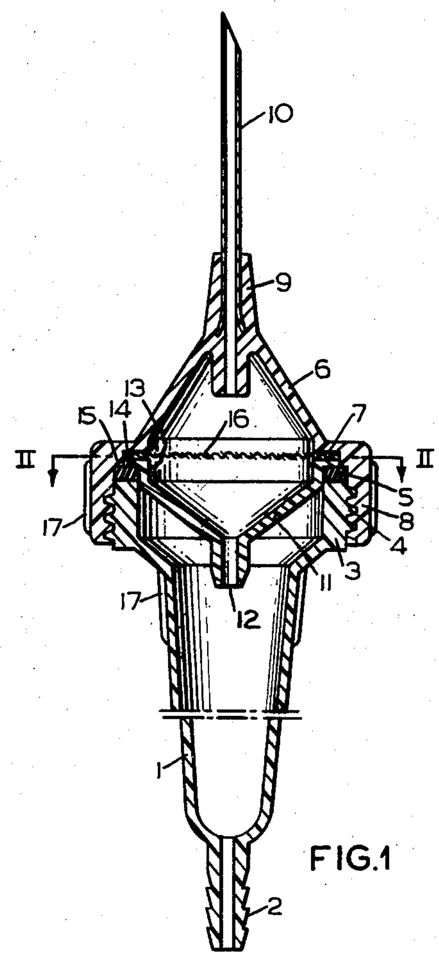

Dec. 14, 1954

J. J. VAN LOGHEM 2,696,818

COMBINED FILTERING AND DROP-COUNTING DEVICE FOR BLOOD TRANSFUSION ADMINISTERING SYSTEM

Filed Sept. 1, 1953

United States Patent Office 2,696,818

Patented Dec. 14, 1954

2,696,818

COMBINED FILTERING AND DROP-COUNTING DEVICE FOR BLOOD TRANSFUSION ADMINISTERING SYSTEMS

Johannes Jacobus van Loghem, Amsterdam, Netherlands, assignor to "Stichting tot Instandhouding van het Centraal Laboratorium van de Bloedtransfusiedienst van het Nederlandse Rode Kruis," a foundation of the Netherlands Application September 1, 1953, Serial No. 377,949

Claims priority, application Netherlands February 10, 1953

8 Claims. (Cl. 128—214)

The invention relates to a combined filtering and drop-counting device for a blood transfusion administering system.

In administering a blood transfusion, the liquid to be administered is generally taken from a suspended container by means of a so-called infusion needle inserted into a bottom wall portion thereof and is led through a flexible tube to the patient. On its way down, the liquid passes a filter means and a drop-counting means for filtering the liquid and for determining the administered quantity which two means are generally combined to form a single device connected at its upper end to the infusion needle and at its lower end to the flexible tube leading downwards.

Combined filtering and drop-counting devices are known, consisting of a tubular glass body inside which a small glass funnel serving as a drop-counter has been mounted by fusing, which glass body can be connected at its lower end to the flexible transfusion tube and at its upper end to a flexible tube leading to the infusion needle, the glass body at this upper end having an end wall provided with a number of small holes so as to form a kind of filter. A glass filtering device of this kind has the disadvantage that it is difficult to clean and sterilize and that its filtering surface area can only be small and the filter-holes relatively large. Furthermore, this filter is unvisible during the transfusion operation as it is covered by the tube enclosing the upper end of the glass body, so that one cannot check whether the filter openings become clogged.

It is, accordingly, an object of the invention to provide a combined filtering and drop-counting device for a blood transfusion administering system which obviates the foregoing disadvantages.

More especially, the invention has for its object to provide a combined filtering and drop-counting device of the kind described, which can be easily taken apart for cleaning and sterilizing purposes and assembled again.

Another object of the invention is to provide a combined filtering and drop-counting device having a relatively large filter area with relatively small filter openings.

The device according to the invention generally comprises a filter casing made at least partly of a transparent material and consisting of an upper and a lower part disconnectably mounted one upon the other, which casing contains a removable, substantially funnel-shaped drop-counting member and a piece of filtering gauze stretched across the wide upper funnel mouth of the drop-counting member, the adjoining edges of this member and of the filtering gauze being tightly held inside the casing upon the engagement of the two parts of the latter.

After having been used, the device according to the invention can thus be taken apart and its parts individually cleaned and sterilized; in reassembling the device, the filtering gauze may be replaced if necessary. Because the filtering gauze extends across the wide mouth of the funnel-shaped drop-counter, the active filter area can be relatively large, allowing the use of a gauze of fine mesh. The liquid to be administered is filtered before it reaches the drop-counting member, so that only the drops of already filtered liquid flowing through the funnel of this member are counted and clogging of the filter cannot result in a miscount.

Figure 2:
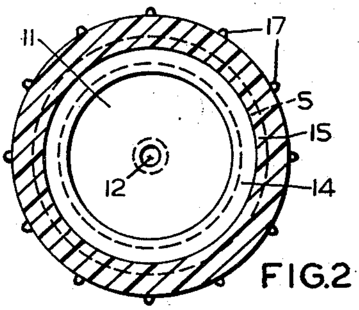

Other objects and features of the novel arrangement according to the present invention and the advantages of this arrangement will appear more fully from the following description and claims in conjunction with the accompanying drawings which illustrate by way of example an embodiment of the invention. In the drawing; Figure 1 shows the device in a longitudinal section and Figure 2 shows a section on the line II—II of Figure 1.

The combined filtering and drop-counting device for a blood transfusion administering system, shown in the drawings comprises a filter casing made of a transparent material and consisting of a lower casing part 1 and an upper casing part 6. Apart from being transparent, the material of the casing parts 1 and 6 and of the member 11 to be described below is preferably water-repellant. A very suitable material of this kind is nylon which is unbreakable and has a softening point sufficiently above the normal sterilization temperature. The lower casing part 1 is substantially cone-shaped, being formed at its lower end into a nipple 2 for the connection of a flexible transfusion tube (not shown) and gradually widening from this nipple end towards a cylindrical portion 3 of greater wall thickness and provided with an external screw thread 4. On the flat annular upper edge of the casing part 1 is placed a rubber gasket ring 5 of rectangular cross-section.

The upper casing part 6 is likewise substantially cone-shaped, widening from a tube-like upper portion 9 towards a cylindrical portion 8, which is internally threaded and encloses and threadedly engages the threaded cylindrical portion 3 of the lower casing part 1.

An infusion needle 10 of non-corrosible steel is mounted in the tube-shaped portion 9. To that effect, the needle 10 has a flared lower end which lies embedded in the body of the portion 9 and is thus fixedly held. By directly mounting the infusion needle in the filter casing, the usual tube connection between these two parts can be dispensed with.

A funnel-shaped drop-counting member 11 is removably mounted inside the wide cylindrical portion 3 of the lower casing part. The member 13 has a small opening 12 at its lower end and a cylindrical wall portion 13 adjoining a radially projecting flange portion 14 at its upper end.

As shown in Figure 1, the rubber gasket ring 5 encloses the cylindrical portion 13 of the funnel-shaped member 11 and has a greater diameter than the flange portion 14 resting on this ring. The upper casing part 6 has between its cone-shaped body and its cylindrical portion 8 a flat annular pressure surface 7 opposite the flange portion 14 and an inwardly projecting annular shoulder 15 which closely fits around the side of the flange portion 14 and adjacent the latter likewise engages the rubber gasket ring 5. A circular piece of filtering gauze 16 lies stretched across the wide mouth of the funnel-shaped member 11, its circumferential edge lying clamped between the flange-portion 14 and the pressure surface 7, when the two casing parts are tightly screwed together.

Both parts of the filter casing are provided with ribs 17 on their outer wall to facilitate the handling of the device.

The functioning of the device described above will need little explanation. When the needle 10 is inserted in the known manner through the wall of a suspended container (not shown) with the liquid to be administered, the liquid will flow through the needle 10 and the tube-shaped portion 9 of the casing onto the filtering gauze 16.

The liquid passing through this filtering gauze flows drop by drop through the narrow opening 12 of the funnel-shaped drop-counting member 11 into the lower casing part 1 and thence down into the flexible transfusion tube (not shown) to be connected to the nipple 2. The drops passing through the opening 12 and falling down inside the casing part 1 can be easily observed and counted through the transparent wall of the casing, whereas the filtering gauze can be observed through the transparent wall of the upper casing part 6 so as to check the correct filtering action thereof.

Because of the relatively large area of the filtering gauze stretching across the wide middle portion of the casing, this gauze can be given a fine mesh, whereby a very effective filtering action is obtained without unduly slowing up the passage of the liquid.

The rubber gasket 5 lying compressed between the upper rim of the lower casing part 1 and the flange portion 14 and shoulder 15 on the one hand and between the cylindrical portion 8 and the cylindrical wall portion 13 on the other hand, forms a fluid-tight seal preventing the liquid from by passing the filter and drop-counting member and at the same time forms an air-tight seal between the two casing parts preventing any leakage of unsterile air into the casing.

The device can easily be taken apart for cleaning and sterilizing purposes by unscrewing the two casing parts 1 and 6 and removing the member 11, gasket ring 5 and filtering gauze 16. If required, the latter can be replaced by a new gauze of the same or a different mesh on reassembling the device.

While the invention has been illustrated and described with reference to a specific embodiment thereof, it will be understood that other embodiments may be resorted to without departing from the invention.

What is claimed is:

1. Combined filtering and drop-counting device for a blood transfusion administering system, comprising a filter casing made at least partly of a transparent material and consisting of an upper and a lower casing part removably mounted one upon the other, a substantially funnel-shaped drop-counting member removably and closely fitting inside said casing, and a piece of filtering gauze stretched across the wide upper funnel mouth of the drop-counting member, the adjoining edges of said member and said gauze being tightly held inside said casing upon the engagement of the two parts of the latter.

2. Device according to claim 1 in which an infusion needle is fixedly mounted in the upper casing part.

3. Device according to claim 1 in which the filter casing and drop-counting member mounted therein are made of a water-repellant transparent material, such as nylon.

4. Combined filtering and drop-counting device for a blood transfusion administering system, comprising a filter casing made at least partly of transparent material and consisting of a disconnectable upper and lower part, a substantially funnel-shaped drop-counting member removably and fittingly mounted inside said lower casing part and extending downward into the latter, and a piece of filtering gauze placed across the upper side of the drop-counting member, said upper casing part having an inwardly projecting portion forming a flat annular pressure surface clampingly engaging the upper edge of the drop-counting member and the edge portion of the filtering gauze placed upon the latter.

5. Combined filtering and drop-counting device for a blood transfusion administering system, comprising a filter casing made at least partly of transparent material and consisting of an upper part and a lower part, the upper casing part having an internally threaded cylindrical lower portion enclosing an externally threaded cylindrical upper portion of the lower casing part, an annular gasket placed on the upper edge of the lower casing part, a substantially funnel-shaped drop-counting member extending downwards into said lower casing part and having a radially projecting flange portion engaging said rubber gasket, and a circular filtering gauze stretched across the upper side of said drop-counting member, said upper casing part having an inwardly projecting portion forming a flat annular pressure surface tightly pressing the edge portion of the filtering gauze against the flange of the drop-counting member and said flange against the annular gasket when the upper casing part is screwed onto the lower casing part.

6. Device according to claim 5 in which the flange portion of the drop-counting member has a diameter which is smaller than the outer diameter of the annular gasket and in which the upper casing part has an inwardly projecting stepped shoulder adjacent said annular pressure surface, said shoulder enclosing the circumferential side edge of the flange portion and pressingly engaging the annular gasket adjacent the flange portion.

7. Combined filtering and drop-counting device for a blood transfusion administering system, comprising a filter casing made of a transparent material and consisting of an upper and a lower casing part, the lower casing part being substantially cone-shaped widening from a nipple at its lower end adapted to receive a transfusion tube towards an externally threaded cylindrical portion at its upper end, the upper casing part having an infusion needle mounted in its upper end and being substantially cone-shaped widening from said upper end towards an internally threaded cylindrical portion at its lower end encloses and threadedly engages the cylindrical portion of the lower casing part, an annular gasket of a resilient material mounted on the upper rim of the lower casing part, a substantially funnel-shaped drop-counting member extending downwards into said lower casing part and having its upper rim formed into a radially extending flange portion resting on said annular gasket, and a circular piece of filtering gauze stretched across the wide upper funnel mouth of the drop-counting member lying with its circumferential edge on said flange portion, the upper casing part having its inner wall opposite the upper edge of the lower casing part formed into an annular pressure surface engaging the edge of the filtering gauze and pressing this edge against said flange portion and the latter against the annular gasket when the two casing parts are tightly screwed together.

8. Device according to claim 7 in which the drop-counting member has a cylindrical wall portion adjacent its flange portion, the annular gasket enclosing said cylindrical wall portion.

References Cited in the file of this patent

UNITED STATES PATENTS

| Number | Name | Date |
|---|---|---|
| 2,214,260 | Ravenscroft et al. | Sept. 10, 1940 |
| 2,315,109 | Cutter | Mar. 30, 1943 |
| 2,586,513 | Butler | Feb. 19, 1952 |

FOREIGN PATENTS

| Number | Country | Date |
|---|---|---|
| 667,933 | Great Britain | Mar. 12, 1952 |